United States Patent [19]

Haiya

[11] Patent Number: 4,732,011
[45] Date of Patent: Mar. 22, 1988

[54] AIR CONDITIONER FOR VEHICLES
[75] Inventor: Sadao Haiya, Konan, Japan
[73] Assignee: Diesel Kiki Co., Ltd., Tokyo, Japan
[21] Appl. No.: 862,484
[22] Filed: May 12, 1986
[30] Foreign Application Priority Data May 17, 1985 [JP] Japan .............................. 60-73075[U]
Jul. 8, 1985 [JP] Japan ............................ 60-103746[U]

[51] Int. Cl.⁴ ..................... B60H 1/32; F25D 23/12
[52] U.S. Cl. ......................................................... 62/244
[58] Field of Search .................. 62/239, 244, 259.1, 62/411, DIG. 16; 98/116

[56] References Cited
U.S. PATENT DOCUMENTS 3,885,398  5/1975  Dawkins ...................... 62/259.1 X
4,217,816  8/1980  Mancinelli ........................... 98/116
4,607,497  8/1986  Ferdows et al. ............. 62/DIG. 16

Primary Examiner—Harry Tanner
Attorney, Agent, or Firm—Wenderoth, Lind & Ponack

[57] ABSTRACT

An air conditioner for a vehicle includes a condenser unit including at least a condenser and a blower associated therewith and a cooling unit including at least an evaporator and a blower associated therewith, the condenser unit and the cooling unit being structurally independent from one another and disposed on a roof of the vehicle in a spaced relation to each other. The condenser unit and the cooling unit are housed in a single casing such that the condenser unit is disposed adjacent the front portion of the casing which is located closer to a front portion of the vehicle than a rear portion of the casing, and the cooling unit is disposed adjacent the rear portion. The casing has a bottom wall separated from the vehicle roof with a space defined therebetween for the passage of the outside air and includes a chamber defined therein communicating with the space through an outside-air intake hole defined in the casing bottom wall. An outside-air blower is disposed in the chamber and has an outlet open to a cooling chamber in which the cooling unit is received. With this construction, upon operation of the outside-air blower, the outside air is introduced into the cooling chamber.

6 Claims, 7 Drawing Figures

AIR CONDITIONER FOR VEHICLES

BACKGROUND OF THE INVENTION

1. Field of the Invention

The present invention relates generally to air conditioners for vehicles, and more particularly to such an air conditioner adapted to be mounted on the roof of a vehicle such as a bus, a motor van or the like.

2. Description of the Related Art

There are various known air conditioners adapted to be mounted on the roof of a vehicle. One such roof-mounted vehicle air conditioner is disclosed in Japanese Patent Laid-open Publication No. 59-223513 and it comprises an evaporator, a blower associated with the evaporator, a condenser and a blower associated with the condenser, all the components being housed in a frame or casing mounted on a vehicle roof.

Since the disclosed air conditioner has a total weight of 250 kg or more, the vehicle roof must be reinforced to withstand a heavy load continuously exerted thereon by the air conditioner system. Because of its heaviness, the air conditioner, since it is disposed on a rear portion of the vehicle roof, makes it necessary to enlarge the size of rear tires or to reduce the number of passenger seats at the rear portion of the vehicle.

Japanese Utility Model Laid-open Publication No. 52-43241 discloses an air conditioner suspended from the ceiling of a vehicle and includes air intake ports for introducing the outside air into the passenger compartment through the air conditioner system. However, problem particular to this air conditioner exists in that only a limited overhead space is available.

Another roof-mounted vehicle air conditioner disclosed in Japanese Utility Model Laid-open Publication No. 56-6611 includes a condenser unit and an evaporator unit disposed on the vehicle roof in a spaced relation to one another and contained in a single casing. The air conditioner further includes a heat exchanger disposed inside the vehicle in a heat-exchanging relation to the condenser, and a blower also disposed inside the vehicle for forcing the inside air to circulate within the passenger compartment. In this air conditioner, the outside air intake is not considered resulting in an undesired contamination of the inside air during operation of the air conditioner.

In a cooling operation mode, the conventional air conditioners generally circulate the inside air alone, instead of introducing the outside air into the vehicle passenger compartment. Such air circulation causes the contamination of the inside air of the vehicle passenger compartment. With this drawback in mind, there is a large demand for a roof-mounted vehicle air conditioner adopting a ventilation system wherein the outside air is introued into the vehicle passenger compartment while the inside air is discharged from the compartment.

SUMMARY OF THE INVENTION

It is accordingly an object of the present invention to provide a roof-mounted vehicle air conditioner having structural features which can be mounted on a vehicle roof without the requiring reinforcement of the roof or the reduction in number of passenger seats located below the air conditioner unit.

Another object of the present invention is to provide an air conditioner mountable on the roof of a vehicle without causing a load to be concentrated on either front wheels or rear wheels of the vehicle.

A further object of the present invention is to provide a roof-mounted vehicle air conditioner capable of introducing the outside air into the passenger compartment, thereby effecting ventilation of a vehicle passenger compartment.

According to the present invention, an air conditioner for a vehicle having a roof comprises a condenser unit including at least a condenser and a first blower associated therewith and a cooling unit including at least an evaporator and a second blower associated therewith, the condenser unit and the cooling unit being structurally independent from one another and disposed on the roof of the vehicle in a spaced apart relation to each other. The condenser unit and the cooling unit are housed in a single casing such that the condenser unit is disposed adjacent the front portion of the casing which is located closer to a front portion of the vehicle than a rear portion of the casing, and the cooling unit is dispoed adjacent the rear portion. The casing has a bottom wall separated from the vehicle roof with a space defined therebetween through which the outside air passes and includes a chamber defined therein. The chamber communicates with the space through an outside-air intake hole defined in the casing bottom wall and houses therein an outside-air blower having an outlet open to a cooling chamber in which the cooling unit is received. With this construction, upon operation of the outside-air blower, the outside air is introduced into the cooling chamber.

Since the condenser unit and the cooling unit of the air conditioner are structurally separated from one another and located in different positions, it is possible to distribute a load exerted by the air conditioner on the vehicle roof and front and rear wheels of the vehicle. Another advantage attained by the air conditioner of the present invention is that while the outside-air blower is in operation, the outside air is introduced in the cooling chamber where it is cooled by the evaporator, then the cooled outside air is blown to a passenger compartment of the vehicle, thereby effecting ventilation of the vehicle passenger compartment.

Many other advantages and features of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION OF THE PREFERRED EMBODIMENTS

Figure 1:
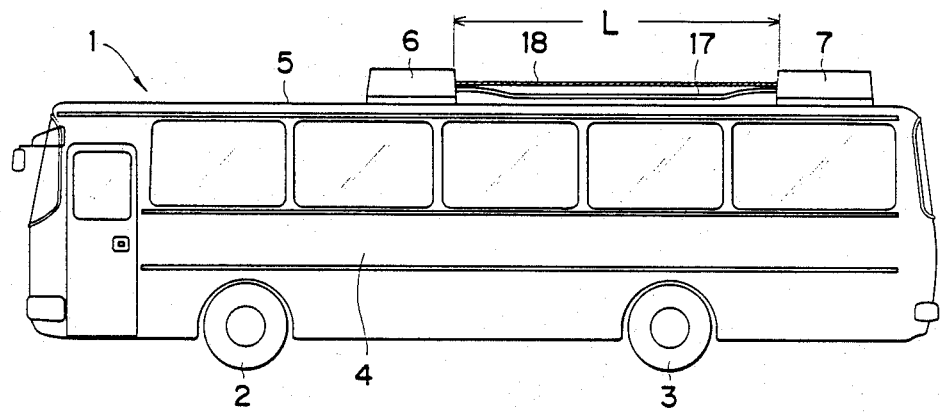
FIG. 1 is a schematic side elevational view, partly in cross section, of a bus including a roof-mounted air conditioner embodying the present invention.

FIG. 1 shows a large motor coach or bus 1 for carrying many passengers, equipped with an air conditioner 5 embodying the present invention. The bus 1 includes at least two pairs of front and rear wheels 2, 3 supporting a vehicle body 4. The body 4 has a roof 5 on which a first casing 6 and a second casing 7 are mounted separately in a substantial spaced apart relation to one another.

Figure 2:
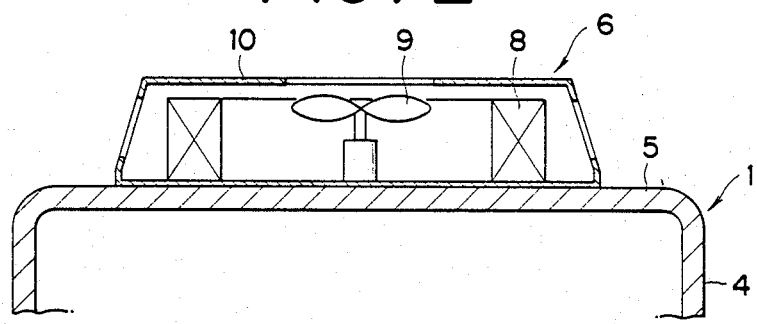
FIG. 2 is an enlarged transverse cross-sectional view of a condenser unit of the air conditioner shown in FIG. 1.

As shown in FIG. 2, the first casing 6 houses therein a condenser 8 and a blower 9 for forcing the outside air against the condenser 8 to cool the latter, the condenser 8 and the blower 9 jointly constitute a condenser unit 10 of the air conditioner. In the illustrated embodiment, the first casing 6 is disposed intermediately on the roof 5 of the vehicle body 4, and more particularly it is located centrally between the front and rear wheels 2, 3.

Figure 3:
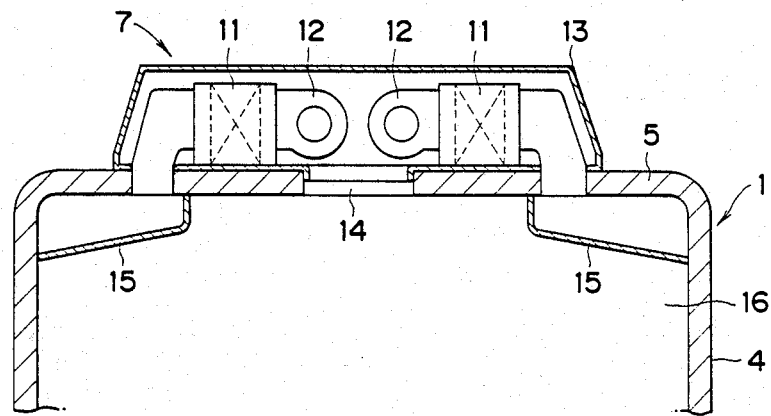
FIG. 3 is a view similar to FIG. 2, showing an evaporator unit of the air conditioner.
Figure 4:
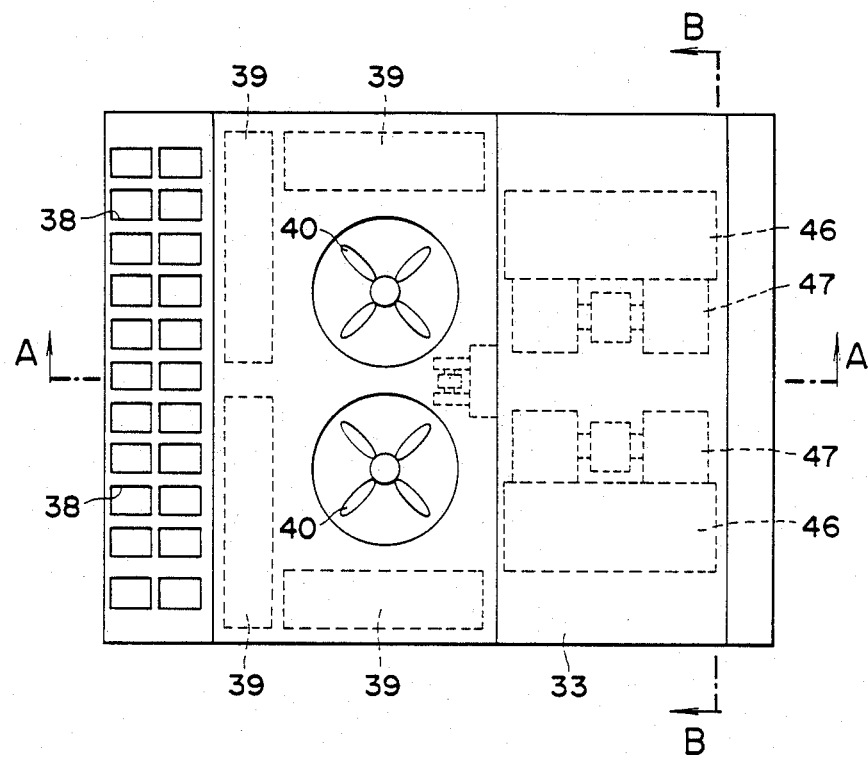
FIG. 4 is a schematic plan view of a modified air conditioner according to the present invention.
Figure 5:
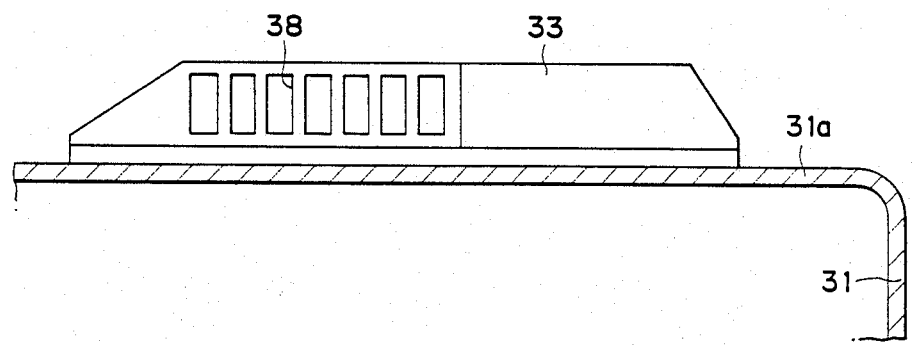
FIG. 5 is a side elevational view of FIG. 4.

The second casing 7 houses, as shown in FIG. 3, a plurality of evaporators 11, 11 (two being shown), and a corresponding number of blowers 12, 12 associated therewith for introducing the air from a passenger compartment 16 to the evaporators 11, 11 to thereby cool the inside air. The evaporators 11 and the blowers 12 jointly constitute a cooling unit 13 of the air conditioner.

In operation, the blowers are driven to cause the inside air to flow through an air intake hole 14 into the second casing 7 where the inside air is cooled by the evaporators 11. The cooled inside air then flows into two air ducts 15, 15 extending along opposite inner shoulders of the vehicle body 4. Finally, the cooled inside air is blown to the passenger compartment 14 from a number of diffusers (not shown) provided on the air ducts 15.

As shown in FIG. 1, the second casing 7 is disposed on a rear portion of the vehicle body 4 and is spaced at an appropriate distance L from the first casing 6. There is a plurality of pipes 17 (only one being shown) extending between the first and second casings 6, 8 to connect the condenser unit 10 and the cooling unit 13, thereby completing a cooling circuit. The pipes 17 are concealed by a pipe cover 18. Though not shown, the cooling circuit includes a compressor driven by a vehicle-driving engine or by an exclusive engine to circulate a refrigerant through the condenser 8 and evaporators 11.

Figure 6:
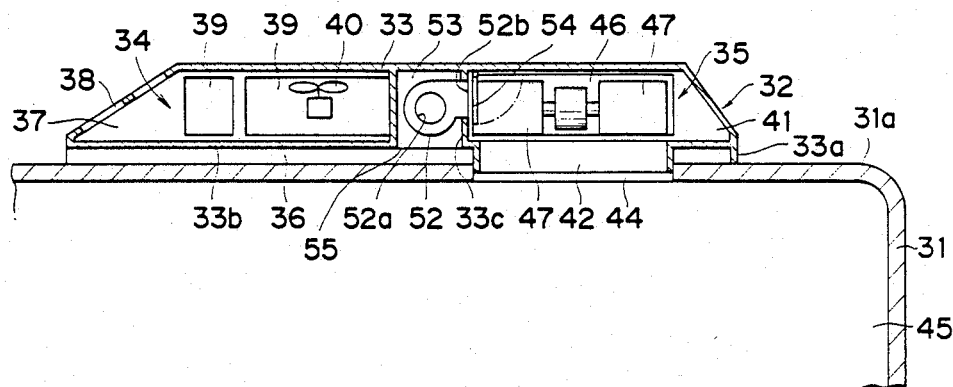
FIG. 6 is a cross-sectional view taken along line A—A of FIG. 4.

According to another embodiment shown in FIGS. 4 to 7, a motor vehicle, such as a bus 31 for example has a roof 31a on which a modified air conditioner 32 is mounted. As shown in FIG. 6, the air conditioner 32 comprises a condenser unit 34 and a cooling unit 35 housed in a third casing 33. The third casing 33 is supported by a lower peripheral support strip 33a with a space 36 defined between a bottom wall 33b of the casing 33 and the vehicle roof 31a through which the outside air passes.

The third casing 33 is in the shape of an elongated box and it includes a condenser unit-receiving first chamber 37 (FIG. 6) defined therein at a front portion thereof, and a number of outside air intake holes 38 defined in a top wall and opposite sidewalls of the casing 33, the intake holes 38 communicating with the first chamber 37. The chamber 37 houses therein four condensers 39 arranged in a generally C-shape along a front wall and the sidewalls of the casing 37, and two blowers 40 disposed centrally with respect to the thus arranged condensers 39. While the blowers 40 are in operation, the outside air is drawn through the intake holes 38 into the first chamber 37 to cool the condensers 39. After having cooled the condensers 39, the outside air is discharged outside the first chamber 37.

Figure 7:
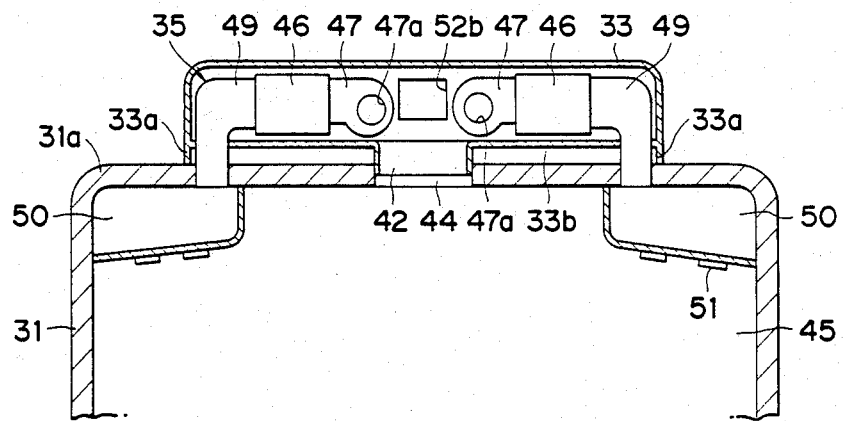
FIG. 7 is a cross-sectional view taken along line B—B of FIG. 4.

The third casing 33 also includes a cooling unit-receiving second chamber 41 (FIG. 6) defined therein at a rear portion thereof. The second chamber 41 communicates with a passenger compartment 45 through an aperture 42 defined in the bottom wall 33b of the third casing 33 and an opening 44 defined in the vehicle roof 31a. As shown in FIG. 7, the second chamber 41 houses therein two evaporators 46, 46 disposed side by side with the aperture 42 disposed therebetween, and two blowers 47, 47 associated with the respective evaporators 46, 46 and in an opposed relation to one another. Each of the evaporators 46 has a downstream end connected to a duct 49 through which the evaporator 46 is held in communication with a cool air passage or duct 50 extending along each inner shoulder of the vehicle body. With this construction, when the blowers 47 are started, the inside air in the second chamber 47 and hence in the passenger compartment 45 is drawn into suction holes 47a of the respective blowers 47 are forced to flow through the evaporators 46 during which time the inside air is cooled. The cooled inside air then flows through the ducts 49 into the passages 50 and finally it is blown from diffusers 51 into the passenger compartment 45.

The third casing 33 further includes a third chamber 53 (FIG. 6) defined between the first and second chambers 37, 41 for receiving an outside-air blower, the third chamber 53 being partially defined by a vertical partition wall 33c and projecting therefrom into the first chamber 37 which houses the condenser unit 34. The third chamber 53 has an outside-air intake hole 55 defined in the bottom wall 33b and open to the space 36. An outside-air blower 52 is disposed in the third chamber 53 and supported by the partition wall 33c. The blower 52 has an inlet 52a opening to the third chamber 53 and an outlet 52b passing through the partition wall 33c and open to the second chamber 41. With this construction, upon energization of the blower 52, the outside air is drawn from the space 36 into the blower 52 and then forced into the second chamber 42 in which the cooling unit 35 is disposed.

The blower 52 includes a shutter 54 disposed inside the second chamber 41 and operative in synchronism with the operation of the blower 52 to open and close the outlet 52b. While the blower 52 is in operation, the shutter 54 opens the outlet 52b whereas the outlet 52b is closed by the shutter 54 when the blower 52 is stopped.

The modified air conditioner 32 thus constructed operates as follows. When the air conditioner 32 is started, the blowers 40 rotate to draw the outside air thereinto through the intake holes 34. The outside air is then forced by the blowers 40 to flow through the condensers 39 for cooling the latter and thereafter it is discharged outside the first chamber 37. At the same time, the blowers 47 rotate to draw the inside air thereinto from the passenger compartment 45 successively through the opening 44, the aperture 42 and the suction hole 47a. Then the inside air is forced by the blowers 47 to flow through the evaporators 46, during which time the inside air is cooled through a heat exchange process. The cooled inside air is fed through the ducts 49 to the cool air passages 50 from which the cooled air is blower through the diffusers 51 into the passenger compartment 45 to cool the latter.

The outside air intake is achieved to effect ventilation of the passenger compartment 45, in response to the operation of the blower 52. When the blower 52 is energized, the shutter 54 pivots upwardly to open the outlet 52b whereupon the outside air is drawn from the space 36 into the blower 52 through the inlet 52a thereof and then it is blown from the outlet 52b by the blower 52 into the second chamber 41. When the blowers 47 in the second chamber 41 are in operation, the outside air is drawn into the blowers 47 and forced by the latter to flow through the ducts 49 and the passages 50 into the passenger compartment 45. When the blowers 47 are stopped, the outside air is fed into the passenger compartment 45 through the aperture 42 and the opening 44. With the ventilation thus achieved, the air in the passenger compartment 45 is kept clean.

Obviously, many modifications and variations of the present invention are possible in the light of the above teachings. It is therefore to be understood that within the scope of the appended claims, the invention may be practiced otherwise than as specifically described.

What is claimed is:

1. An air conditioner for a vehicle having a roof, comprising:
   a condensor unit including a condensor and a first blower for directing air toward said condensor;
   a cooling unit including an evaporator and a second blower for directing air past said evaporator;
   a casing means on the roof and in which said condensor unit and said cooling unit are disposed,
   said casing means having a bottom wall overlying and spaced from the roof so as to define a space therebetween open to the exterior of the casing means, an outside air intake hole bordered by said bottom wall and open to said space, and a chamber open to said outside air intake hole; and
   a third blower within said chamber for drawing air from the exterior of the casing means through said outside air intake hole and into the cooling unit.

2. An air conditioner as claimed in claim 1,
   and further comprising a shutter movable between a first position at which said outside air intake hole is effectively closed thereby and a second position at which said outside air intake hole is effectively open; and
   means for operatively connecting said third blower to said shutter and for synchronously operating said third blower and said shutter so that said shutter assumes said first position when said third blower is not operating and said shutter assumes said second position when said third blower is operating.

3. An air conditioner as claimed in claim 1,
   wherein said casing means has a second chamber defined therein in which said condensor unit is disposed and a third chamber defined therein in which said cooling unit is disposed.

4. An air conditioner as claimed in claim 1,
   wherein said space is open to the exterior of the casing means at a location facing the front of the vehicle.

5. An air conditioner for a vehicle having a passenger compartment covered by a roof, comprising:
   a condensor unit including a condensor and a first blower means for directing air toward said condensor;
   a cooling unit including an evaporator and a second blower means for blowing air past said evaporator;
   a casing means on the roof and in which said condensor unit and said cooling unit are disposed,
   said casing means having an aperture extending therethrough open between the passenger compartment and the cooling unit for maintaining the cooling unit in communication with the passenger compartment during operation of the air conditioner and through which air from the passenger compartment is drawn by said second blower means when said second blower means is operated, an outside air intake hole open to the exterior of the casing means, and a chamber defined therein open between and communicating with said cooling unit and said outside air intake hole;
   a third blower means in said chamber for drawing outside air into the cooling unit to mix with air drawn through said aperture by said second blower means when said second blower means is operated and for drawing outside air into the passenger compartment through said aperture to ventilate the passenger compartment when said second blower means is not operated.

6. An air conditioner as claimed in claim 5,
   and further comprising a shutter movable between a first position at which said outside air intake hole is effectively closed thereby and a second position at which said outside air intake hole is effectively open; and
   means for operatively connecting said third blower means to said shutter and for synchronously operating said third blower means and said shutter so that said shutter assumes said first position when said third blower means is not operating and said shutter assumes said second position when said third blower means is operating.

* * * * *